United States Patent [19]

Heim et al.

[11] Patent Number: 4,750,520

[45] Date of Patent: Jun. 14, 1988

[54] ELECTRICALLY-ACTUABLE VALVE

[75] Inventors: Ulrich Heim, Lübeck; Scato Albarda, Gross Schenkenberg, both of Fed. Rep. of Germany

[73] Assignee: Drägerwerk Aktiengesellschaft, Lübeck, Fed. Rep. of Germany

[21] Appl. No.: 107,293

[22] Filed: Oct. 9, 1987

[30] Foreign Application Priority Data

Oct. 16, 1986 [DE] Fed. Rep. of Germany ....... 3635216

[51] Int. Cl.⁴ .......................... F16K 1/00; F16K 31/02
[52] U.S. Cl. ................................. 137/625.33; 251/11; 251/129.02
[58] Field of Search .............. 137/599, 625.28, 625.33; 251/11, 129.01, 129.02

[56] References Cited

U.S. PATENT DOCUMENTS

| | | | |
|---|---|---|---|
| 2,838,068 | 6/1958 | Ray | 137/625.33 |
| 3,465,962 | 9/1969 | Matulich et al. | 251/11 |
| 3,613,732 | 10/1971 | Willson et al. | 251/11 |
| 3,625,002 | 12/1971 | Davis | 251/11 |
| 3,729,025 | 4/1973 | Silvestrini | 137/625.33 |
| 3,845,931 | 11/1974 | Pimentel | 251/11 |
| 3,853,268 | 12/1974 | Schneider | 137/625.33 |
| 4,300,595 | 11/1981 | Mayer et al. | 251/129.01 |

FOREIGN PATENT DOCUMENTS 3006298 8/1981 Fed. Rep. of Germany ...... 137/599

*Primary Examiner*—George L. Walton
*Attorney, Agent, or Firm*—Walter Ottesen

[57] ABSTRACT

The invention is directed to an electrically-actuable valve for a fluid such as a gaseous medium. The valve has a valve closure member disposed adjacent a valve plate provided with a plurality of pass-through openings. The valve closure member and the valve plate are displaceable relative to one another in a direction perpendicular to their surfaces by means of a short-stroke drive whereby a plurality of sealing lines are opened. To arrive at a good valve operation especially for relatively small valves, the valve plate is configured with a plurality of pass-through openings or perforations. The surface of the valve plate facing the valve closure member has a plurality of raised portions formed thereon defining respective receiving surfaces for receiving the closure member in contact engagement therewith to form the sealing lines when the valve is in the closed position. Each two mutually adjacent ones of said raised portions define a flow channel open toward the closure member and communicating with the outlet of the valve. The pass-through openings lie within the raised portions and extend from the other side of the valve plate to the receiving surface and communicate with the channels when the valve is open and the valve closure member is displaced away from the valve plate thereby enabling the gaseous medium to flow from the inlet of the valve to the outlet thereof.

15 Claims, 3 Drawing Sheets

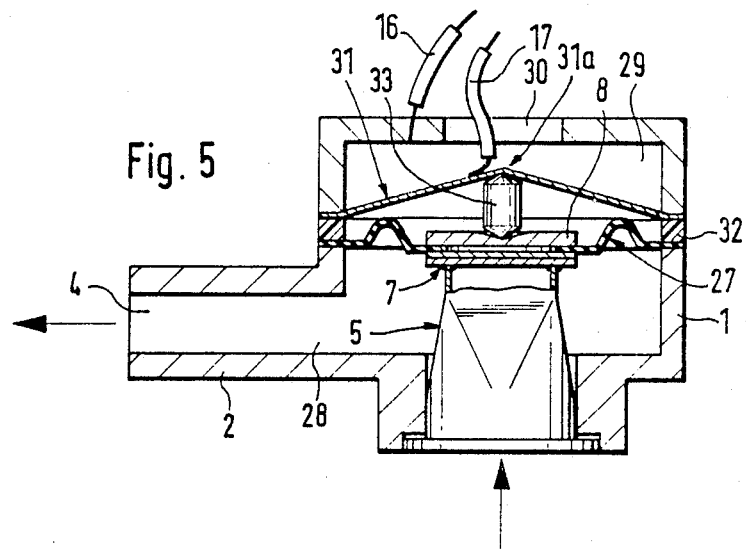
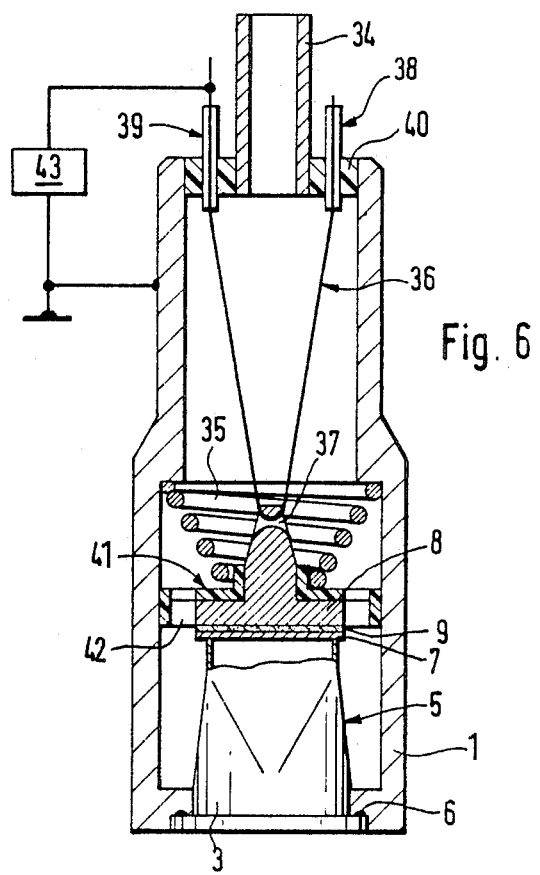

ELECTRICALLY-ACTUABLE VALVE

FIELD OF THE INVENTION

The invention relates to an electrically-actuable valve for a fluid and especially for gaseous mediums. In this valve, a valve member is arranged opposite a valve plate having a plurality of perforations formed therein. The valve member and the valve plate are displaceable relative to each other by means of a short-stroke drive in a direction perpendicular to the respective surfaces of the valve plate and valve member thereby causing a plurality of sealing lines to be opened.

BACKGROUND OF THE INVENTION

Very high requirements are imposed upon valves especially insofar as they are used to control the flow of gaseous mediums in medical applications. On the one hand, it is intended that the resistance to flow should be as small as possible for the opened condition and, on the other hand, it is considered important that a complete seal be provided in the closed condition. Furthermore, the effort required to actuate the valve should be of a low level. The movable masses should be held as small as possible in order to maintain the impact forces associated with the movement of the valve and the generated sound as low as possible.

Especially with respect to the last-mentioned condition, valve types have been introduced wherein two essentially plate-shaped valve components are disposed opposite each other at a relatively short spacing. These valve components can be designated as a valve plate and as a valve member. The valve plates have openings which are covered over by the valve member in the closed condition of the valve. The sealing lines are therefore essentially formed by the peripheral lines of the openings.

A short-stroke drive is provided for actuating the valve and moves the valve element and the valve plate relative to one another. The valve plate is usually fixedly mounted and the short-stroke drive moves the valve member in a direction perpendicular to the surface of the plate. The stroke length of the short-stroke drive is only a fraction of the diameter of the plate.

A valve of this kind is described, for example, in German published patent application DE-OS No. 30 06 298. In this valve, the stationary valve plate has two ring lands which conjointly define an annular channel therebetween in which the medium to be controlled can enter via a corresponding ring-shaped line. The valve member has two ring lands lying opposite corresponding ones of the ring lands of the valve plate so that the ring lands of the valve member and of the valve plate press against each other in the closed condition and define sealing lines. The valve member is driven by a piezo-electric drive.

Low actuating power and a low-noise movement are achieved in the known valves by means of the short stroke length. The flow resistance is relatively low notwithstanding the short stroke length because of the relatively large cross-sectional surface of the valve plate and the openings contained therein. However, a considerable effort is required in order to obtain an adequate seal when viewed in the context of the long sealing lines which are required. For this reason, plate valves of this kind have not gained acceptance especially for valves of small configuration.

SUMMARY OF THE INVENTION

It is an object of the invention to provide a valve of the above-mentioned type which is improved such that a low flow resistance is provided on the one hand and, a very good sealing effect at a relatively low manufacturing cost is provided on the other hand. It should be especially possible to produce relatively small valves in the form of plate valves as they are needed in many situations for medical purposes.

The electrically-actuable valve according to the invention is especially suitable for a fluid such as a gaseous medium. The valve includes: a housing having an inlet for admitting the medium into the valve and an outlet for passing the medium out and away from the valve; a valve closure member mounted in the housing; a valve plate member also mounted in the housing adjacent the valve closure member; the valve plate member having a first surface facing toward the closure member and a second surface facing toward the inlet, the valve plate member including: a plurality of raised portions formed on the first surface one adjacent the other so as to define a plurality of flow channels communicating with the outlet; the raised portions defining respective flat sealing surfaces facing the valve closure member; a plurality of pass-through openings formed in the valve plate member so as to lie within selected ones of the raised portions and to extend from the second side to the flat sealing surface; the valve plate member having flat sealing surface means formed thereon so as to be disposed directly opposite the flat sealing surfaces of the raised portions; and, short-stroke drive means for moving the members relative to each other between a first position wherein the sealing surface means is in contact engagement with the flat sealing surfaces thereby closing the valve and a second position wherein members are spaced apart so as to clear the openings to permit the medium to pass therethrough and along the channels to the outlet.

The valve plate of the valve according to the invention is easy to manufacture. The perforations or pass-through openings are preferably of conical configuration. More specifically, the openings are of a shape corresponding to a truncated cone or truncated pyramid. They can be provided in the valve plate, for example, by means of drilling or stamping. The flow channels are advantageously formed by using known material-removal processes.

A mask-etching technique as known in the manufacture of semiconductors is preferably utilized to produce the valve plate. In this way, especially relatively small valve plates can be produced with very high precision in large numbers and at a relatively low cost. Such a valve plate consists preferably of a semiconductor material such as silicon.

The raised portions which define the sealing surfaces for receiving the valve closure member thereon and in which the perforations lie can have various forms. On the one hand, the configuration of these raised portions are aligned according to the requirements of the best possible course of flow and, on the other hand, they are aligned also with a view toward a simple manufacture. Elongated raised portions are especially suitable wherein respective pluralities of perforations lie in the raised portions and each two mutually adjacent ones of the raised portions define an elongated channel. Such raised portions can have the form of elongated strips.

For the seal-tightness of the valve according to the invention, it is important that the valve plate member and the valve closure member are in planar contact engagement with each other over their entire contact engaging surfaces when the valve is in the closed condition. For this reason, the short-stroke drive is preferably connected with the member to be moved via a connecting part which makes possible an adaptation of the position of the moved member with respect to the stationary member. Either the valve closure member or the valve plate member can be the member moved by the short-stroke drive. The connecting part can preferably have the characteristic of a ball joint and a resilient joint has been shown to be especially practical in achieving this adaptation.

The short-stroke drive can be configured in various ways. For example, this drive can be achieved utilizing piezo-electric or magneto-strictive length changes. However, a short-stroke drive which has been especially advantageous is one based on heat expansion. For this purpose, an electrically heatable expandable part is provided which is connected at one end thereof with the appropriate member of the valve.

BRIEF DESCRIPTION OF THE DRAWINGS

The invention will now be described with reference to the drawings wherein:

FIG. 5 is an elevation view, in section, of a further embodiment of a valve according to the invention; and, FIG. 6 is an elevation view, in section, of a still further embodiment of a valve according to the invention.

DESCRIPTION OF THE PREFERRED EMBODIMENTS OF THE INVENTION

Figure 1:
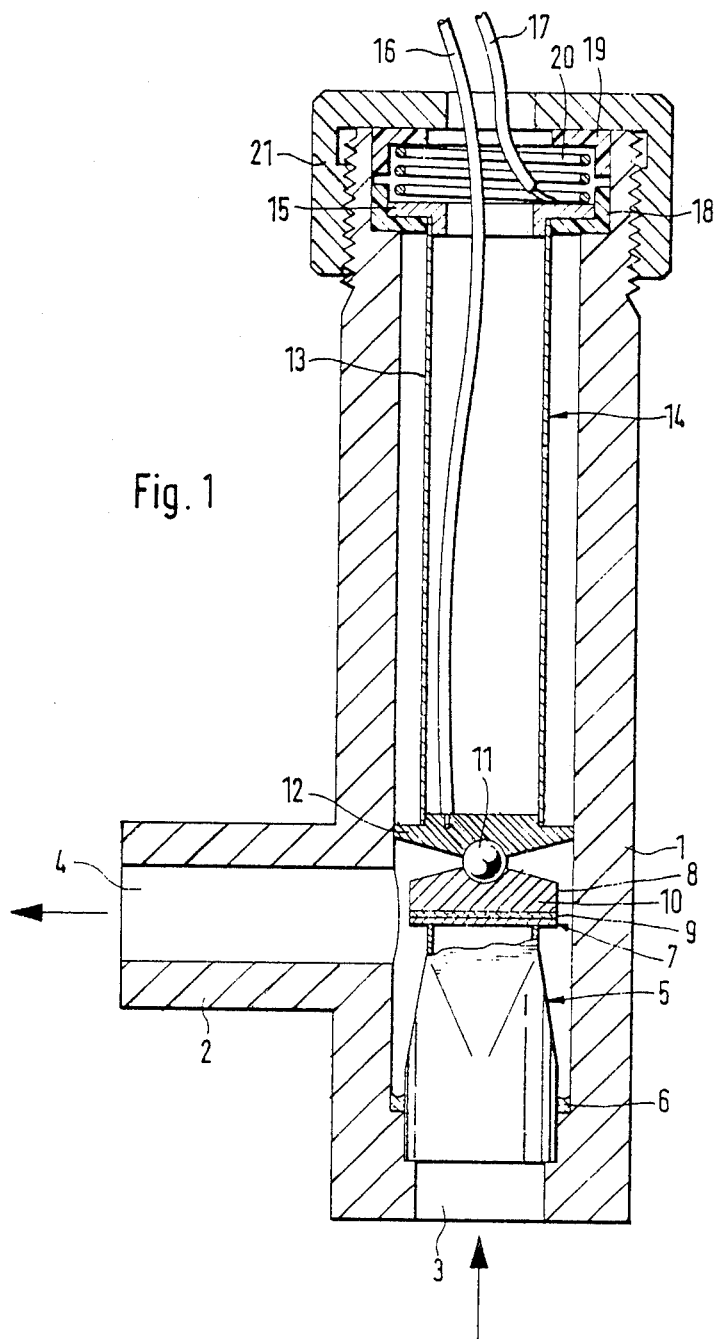
FIG. 1 is a side elevation view, in section, of a angle valve according to an embodiment of the invention.

The valve illustrated in FIG. 1 has an essentially tubular-shaped housing 1 with a connecting stub 2 mounted laterally thereon which is likewise configured to be tubular shaped. An inlet opening 3 is located at the lower end of the housing 1 and an outlet opening 4 is provided in the connecting stub 2.

A tubular-shaped mounting piece 5 is disposed at the lower end of the housing 1 and is attached in a gas-tight manner, for example, with the aid of a solder seam 6. A valve plate 7 defines the upper end of the mounting piece 5. The mounting piece 5 is configured so as to be a round tube along the solder seam 6 and is formed toward the valve plate 7 to be a tube of square cross section. This makes possible a tight soldering of the mounting piece 5 with the solder edge 45 of the valve plate 7. A movable valve member 8 is provided above this valve plate 7 and is assembled from an even-surfaced sealing plate 9 and a supporting member 10 connected to the latter. The sealing plate 9 lies in contact engagement on the valve plate 7 in the closed condition.

The valve member 8 is connected with a lower end plate 12 of a short-stroke drive 14 via a ball joint 11. At the same time, the lower end plate 12 functions as a guide in the opening of the housing 1. The short-stroke drive 14 includes an expandable part in the form of a thin-walled tube 13 to which an upper end plate 15 is attached. Supply leads 16 and 17 are connected to the lower end plate 12 and the upper end plate 15, respectively. A voltage supply source is connected to the supply leads 16 and 17 for applying a heating voltage to the thin-walled tube 13.

The upper end plate 15 is supported against a pressure spring 20 with the aid of two shell pieces 18 and 19 made of electrically insulating material. At the same time, this pressure spring 20 is braced on one end against the threaded cap 21 via the shell piece 19. The cap 21 threadably engages the housing 1 as shown. The upper end plate 15 is displaceable in the lower shell piece 18 against the spring-biasing force. By means of this journalling of the upper end plate 15, a good fixation of the short-stroke drive 14 for the open valve is obtained on the one hand, and on the other hand, an overload protection is provided in the closed position because the upper end plate 15 can yield.

Figure 2:
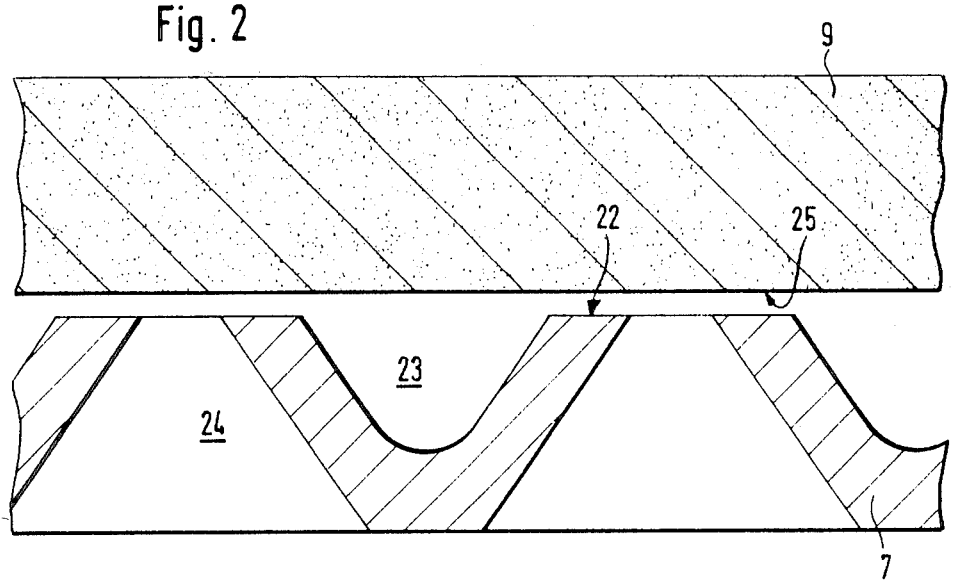
FIG. 2 is a section view taken through a portion of the valve closure member and the valve plate.

The structure of the valve plate 7 and the sealing plate 9 is shown in the greatly enlarged cutout section view of FIG. 2. The valve plate 7 is shown to have raised portions 22 which define sealing surfaces and slot-like recesses 23 which serve as flow channels and which extend to the peripheral edge of the engaging surface of the valve plate 7. Conical pass-through openings or perforations 24 are provided within the raised portions 22.

The surface 25 of the sealing plate 9 facing toward the valve plate 7 is configured so as to be even-surfaced. However, it can be desirable to not only provide the valve plate 7 with a structured configuration; rather, the valve member 8 can also have a structured configuration, that is, the sealing plate 9 of the valve member 8 can be structured on its surface 25. In this way, enlarged flow paths are obtained in the open position of the valve. However, in this case, the surface regions of the valve member 8, which are mounted opposite to the upper surfaces of the raised portions 22 of the valve plate, are likewise even-surfaced in order to provide a seal with respect to these raised portions 22 in the closed position.

Figure 3:
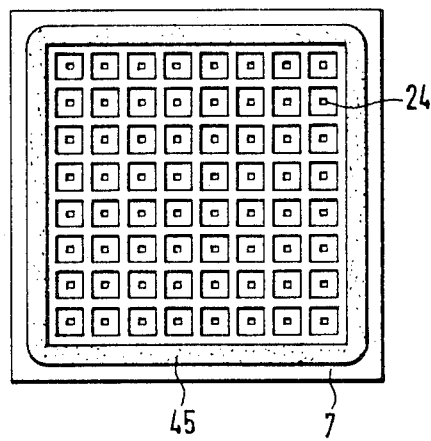
FIG. 3 is a plan view of an embodiment of the valve plate as viewed from the lower side thereof.

FIG. 3 shows the lower side of valve plate 7 facing toward the inlet opening 3. The conical perforations have an approximately quadratic cross section. A galvanically applied solder edge 45 makes the solder connection between the valve plate 7 and the mounting piece 5 possible.

Figure 4:
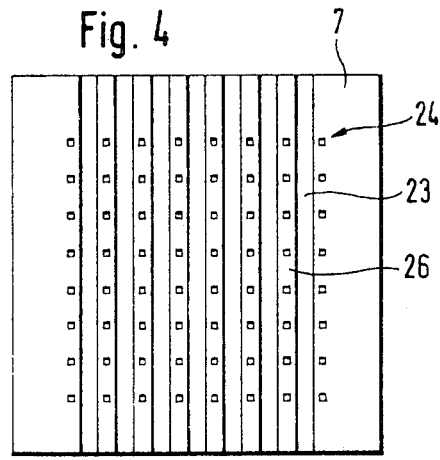
FIG. 4 is a plan view of the upper side of the valve plate shown in FIG. 3.

The upper side of the valve plate 7 shown in FIG. 4 faces toward the sealing plate 9 and has strip-like raised portions 26 having respective sets of perforations 24. Here, the slot-like recesses 23 extend between the strip-like raised portions 26 so as to lie parallel to the latter.

The valve plate is preferably produced by means of a masking-etching technique. Produced in this way, the perforations 24 are formed to have a conical cross section and the slot-like recesses 23 are formed to have a wedge-shaped cross section. The slot-like recesses 23 are etched from the one side of the plate; whereas, the perforations are etched into the plate from the other side thereof. Since the structures formed by the etching process run parallel to one another, a valve plate is formed which has a relatively low mass while at the same time has adequate stability. Silicon is advantageously used as a material for the valve plate 7. However, if required, other etchable semiconductor materials such as photochemically activatable glass, silicon carbide or silicon nitrite can be used.

The angle valve shown in FIG. 1 is provided with the valve plate shown in FIGS. 2 to 4. For the condition where there is no current or, more specifically, when the tube 13 is not heated, the angle valve of FIG. 1 is opened by means of the formation of a gap between the valve member 8 and the valve plate 7. It has been found that even a valve stroke of only 0.05 mm is adequate in the open condition to clear flow paths by means of the structuring of the valve plate. The flow paths provide a sufficiently low flow resistance of the open valve. When current flows and the tube 13 is heated, the valve element 8 is pressed against the valve plate 7 thereby closing the valve. The ball joint 11 makes possible the complete planar contact engagement between the surfaces of the valve member 8 and of the valve plate 7 in the closed position.

If the valve according to the invention is made with a flexible valve plate 7, the valve plate should be mounted on the side charged with the pressure of the medium present when the valve is closed. When the valve is opened, the valve plate 7 will curve slightly in the direction of the flowing medium. In the closed condition, this curvature is canceled by means of the applied pressure of the even-surfaced valve element 8. It has been shown that this arrangement provides an especially good sealing action.

In the valve shown in FIG. 5, the valve element 8 is attached to an annular membrane 27. The annular membrane 27 is tightly attached with its outer edge to the inner wall of the housing 1. In this way, the membrane 27 partitions the inner chamber of the housing into two component chambers, namely, the flow chamber 28 and the control chamber 29. The control chamber 29 can be connected via an opening 30 with a pneumatic control arrangement so that the valve can be additionally controlled pneumatically. An insulating ring 32 is provided between the upper and lower housing parts in order to electrically separate the current-conducting upper housing part from the lower housing part.

A cone-shaped spoked wheel 31 serves as the expandable part of the short-stroke drive. The spoked wheel is produced from a thin metal plate and includes a central hub, a rim attached to the housing and spokes between the hub and the rim. When a voltage is applied across the hub and rim via leads 16 and 17, the heating of the spokes leads to an expansion in the direction of the apex of the cone.

The movement of the hub 31a of the spoked wheel is transmitted to the valve member 8 via a transmitting pin 33 mounted in a form-tight manner so that the valve member 8 lifts up from the valve plate 7 under the action of the membrane pretension when current passes through the spoked wheel causing the latter to open the valve.

FIG. 6 shows a through-pass valve having an output stub 34 mounted coaxially to the tubular-shaped housing 1. The valve member 8 is pretensioned in the direction toward the valve plate 7 by means of a conical pressure spring 35. An approximately V-shaped bent heating wire 36 is used as an expandable part. The midportion of the heating wire 36 passes through a loop 37 of the valve member 8. Both arms of the heating wire 36 are inserted into a cover portion 40 made of insulating material with the aid of twist sleeves 38 and 39.

The length of the heating wire 36 is so selected that it holds the valve open against the biasing force of the pressure spring 35 at normal temperature. The application of heating voltage to the heating wire 36 leads to an expansion of the wire whereby the valve closes.

In such a valve and especially in the embodiment of the valve shown in FIG. 6, a capacitive displacement measurement is possible in order to determine the opening displacement between the valve member 8 and the valve plate 7. For this purpose, a guide disc 41 made of insulating material is provided in the embodiment according to FIG. 6 which moves with the valve member 8. The guide disc 41 insulates the valve member 8 with respect to the housing 1 and has pass-through openings 42. The sealing plate 9 of the valve member 8 likewise is made of an insulating material such as ceramic. The metal parts of the valve member 8 are conductively connected with the heating wire 36. In this way, the capacitance of the capacitor defined by the valve member 8 and the valve plate 7 lying at ground potential can be determined. A measuring device 43 for measuring capacitance can be used to make measurements. The capacitance measuring value is a measure of the spacing between the valve member 8 and the valve plate 7.

It is understood that the foregoing description is that of the preferred embodiments of the invention and that various changes and modifications may be made thereto without departing from the spirit and scope of the invention as defined in the appended claims.

What is claimed is:

1. An electrically-actuable valve for a fluid such as a gaseous medium, the valve comprising:
    a housing having an inlet for admitting said medium into the valve and an outlet for passing the medium out and away from said valve;
    a valve closure member mounted in said housing;
    a valve plate member also mounted in said housing adjacent said valve closure member;
    said valve plate member having a first surface facing toward said closure member and a second surface facing toward said inlet, said valve plate member having a peripheral edge and including: a plurality of raised portions formed on said first surface one adjacent the other; each two mutually adjacent ones of said raised portions defining a flow channel therebetween;
    said raised portions defining respective flat sealing surfaces facing said valve closure member;
    a plurality of pass-through openings formed in said valve plate member so as to lie within selected ones of said raised portions and to extend from said second side to the flat sealing surface for passing the gaseous medium therethrough;
    said valve closure member having flat sealing surface means formed thereon so as to be disposed directly opposite said flat sealing surfaces of said raised portions; and,
    drive means for moving said members relative to each other between a first position wherein said sealing surface means is in contact engagement with said flat sealing surfaces thereby closing the valve and a second position wherein said members are spaced apart so as to clear said openings to permit the gaseous medium to pass from said openings and into and along said flow channels; and,
    said flow channels being formed on said first surface so as to open at said edge for guiding the gaseous medium from said openings toward said outlet.

2. The electrically-actuable valve of claim 1, said pass-through openings being openings etched into said member with the aid of a mask-etching process.

3. The electrically-actuable valve of claim 2, said valve plate being made of a semiconductor material.

4. The electrically-actuable valve of claim 3, said semiconductor material being silicon.

5. The electrically-actuable valve of claim 4, said plurality of openings being grouped into a plurality of sets of openings corresponding to respective ones of said raised portions, each one of said sets of openings including at least one of said openings.

6. The electrically-actuable valve of claim 1, said raised portions being strip-like portions and each two mutually adjacent ones of said strip-like portions defining a corresponding one of said flow channels; said plurality of openings being grouped into a plurality of sets of openings corresponding to respective ones of said strip-like portions, each one of said sets including a predetermined number of the openings arranged one behind the other in the longitudinal direction of the corresponding one of said strip-like portions.

7. The electrically-actuable valve of claim 2, each of said pass-through openings being formed in said valve plate so as to have a conical configuration.

8. The electrically-actuable valve of claim 1, said short-stroke drive means including connecting means connected to said valve closure member for imparting a positioning force to the latter so as to cause said sealing surface means to be seated in seal-tight contact engagement against said flat sealing surfaces when said members are in said first position.

9. The electrically-actuable valve of claim 8, said connecting means comprising a ball joint connected to said valve closure member.

10. The electrically-actuable valve of claim 1, said short-stroke drive means comprising: an elongated expandable part connected at one end thereof to one of said members; and, electrical supply means connected across said expandable part for heating and causing the same to expand thereby moving said one member relative to the other one of said members.

11. The electrically-actuable valve of claim 10, said elongated expandable part being of tubular configuration.

12. The electrically-actuable valve of claim 10, said elongated expandable part having a wire-like configuration; and, said short-stroke drive further comprising a spring interposed between said one member and said housing so as to resiliently bias said member to bring said flat sealing surface means into contact engagement with said flat sealing surfaces of said raised portions 13. The electrically-actuable valve of claim 11, said short-stroke drive means comprising resilient displacement means interposed between said housing and the other end of said elongated extension for permitting said extension to expand against said spring when said members are in said first position thereby protecting said members from damage.

14. The electrically-actuable valve of claim 1, said short-stroke drive means comprising: an annular membrane for holding said one member in said housing so as to resiliently bias said one member away from said other member; a wheel-like expandable part having a hub, an outer rim connected to said housing and a plurality of spokes connected between said rim and said hub; a force transmitting pin arranged form-tight between said expandable part and said one member for transmitting a force from said expandable part to said one member for holding said members in said first position against the resilient biasing force of said annular membrane; and, electric supply means for applying a heating voltage across said spokes so as to expand the latter and reduce the force transmitted from said hub to said one member whereby said annular membrane resiliently biases said one member away from said other member to open said valve.

15. The electrically-actuable valve of claim 1, comprising a measuring device for capacitively measuring the displacement between said members.

* * * * *